United States Patent [19]

Deutsch et al.

[11] Patent Number: 4,620,469

[45] Date of Patent: Nov. 4, 1986

[54] KEY ASSIGNOR FOR A TOUCH RESPONSIVE ELECTRONIC MUSICAL INSTRUMENT

[75] Inventors: Ralph Deutsch, Sherman Oaks; Leslie J. Deutsch, Sepulveda, both of Calif.

[73] Assignee: Kawai Musical Instrument Mfg. Co., Ltd, Hamamatsu, Japan

[21] Appl. No.: 677,637

[22] Filed: Dec. 3, 1984

[51] Int. Cl.[4] .......................... G01H 1/02; G01H 1/46

[52] U.S. Cl. ........................................ 84/1.24; 84/1.27

[58] Field of Search ........................ 84/1.01, 1.03, 1.1, 84/1.24, 1.27, DIG. 7, DIG. 29, 115, 462

[56] References Cited

U.S. PATENT DOCUMENTS 3,882,751 5/1975 Tomisawa et al. .............. 84/1.27 X
4,351,221 9/1982 Starnes et al. ................... 84/1.24 X
4,469,000 9/1984 Fujiwara et al. ..................... 84/115
4,493,237 1/1985 DeLong et al. .................. 84/1.1 X

*Primary Examiner*—William B. Perkey
*Attorney, Agent, or Firm*—Ralph Deutsch

[57] ABSTRACT

A keyboard operated musical instrument is disclosed in which the speed of successively closing a first and second key contact on a keyboard switch is measured by means of a key detect and assignor system. A fast response time is obtained by scanning only the second set of key contacts which correspond to a previously detected closure of a first key contact. The measured closure speed can be used to control various musical effects such as the initial loudness in a touch responsive tone generation system. A method is also disclosed for measuring and utilizing the speed with which a keyswitch is released.

11 Claims, 3 Drawing Figures

KEY ASSIGNOR FOR A TOUCH RESPONSIVE ELECTRONIC MUSICAL INSTRUMENT

BACKGROUND OF THE INVENTION

1. Field of the Invention

This invention relates to electronic keyboard operated musical instruments, and in particular it is concerned with a touch responsive keyboard instrument.

2. Description of the Prior Art

An electronic instrument designed to duplicate electronically the percussive qualities of an acoustic piano requires that the tone generators be touch responsive. The force with which the keys are depressed must control the peak amplitude of the corresponding generated musical tone. Velocity sensing devices have been used which are operated by the keyboard switches. These devices have included magnets which move relative to an induction coil thereby generating a voltage that is proportional to the relative velocity between the magnet and the coil. Other velocity sensors include inertial springs and microphones.

In U.S. Pat. No. 4,121,490 entitled "Touch Responsive Electronic Piano" a keyboard operated musical tone generator is described which is touch responsive to the force applied to the keyboard mechanism. The depression of a key operates through a pneumatic transducer to provide an air stream having a velocity proportional to the force applied to the key. A velocity microphone transducer responsive to the velocity of the gas produces an output pulse having a peak amplitude proportional to the peak velocity of the air stream. The voltage pulse is used to control the peak amplitude of a musical tone generated in response to the operation of the key so that a direct relation exists between the force with which the key is operated and the amplitude of the resulting sound generated by the instrument.

A commonly employed velocity sensor is one in which two key contacts are arranged to be actuated in sequence as a keyswitch is depressed. The time interval between the successive closure of the two switches is measured and the result is used to control the initial loudness of a corresponding generated musical tone.

The present invention provides a novel implementation for measuring the time interval between the successive key contact closures for key switches having two key contacts.

SUMMARY OF THE INVENTION

In a keyboard operated electronic musical tone generator an array of keyboard switches is provided with each keyboard switch having a pair of switch contacts. The contacts are arranged so that when a keyswitch is depressed the first contact will close before the second contact is closed and when the keyswitch is released the second contact will open before the first contact is opened. The keyswitches are arranged in groups and a group can correspond to an octave of keyswitches. The keyswitches are scanned by groups in a search mode. If any one of the first contacts in a group is found to be closed then the search operation is temporarily interrupted. If the closed switch contact is one that had been closed on a previous search scan, then no action is taken. If a new first contact closure is found a preassignment is made by encoding an assigment data word which identifies the keyswitch and the time at which the first key contact closure is detected. The assignment data words are stored in a memory.

Only the keyswitches which have been preassigned are scanned for determining the state of their corresponding second key contacts. The scanning of the second key contacts is controlled by the keyswitch identification information encoded in the assignment data words read out from memory. When a second key contact is found to have been closed the assignment data word is encoded with the time difference between the time at which the first and second key contacts were found to be closed.

A plurality of tone generators are provided each of which correspond to an assignment data word stored in the memory. The time difference is decoded to control the loudness of the generated musical tone thereby producing a touch responsive control of the loudness.

A method is also described for measuring the release speed with which a depressed keyswitch is released. The release speed measurement is encoded into the assignment data word which is assigned to one of the tone generators. The speed of releasing a previously depressed keyswitch can be used to control musical effects including the release time for the release phase of the musical tone.

BRIEF DESCRIPTION OF THE DRAWINGS

The detailed description of the invention is made with reference to the accompanying drawings wherein like numerals designate like components in the figures.

DETAILED DESCRIPTION OF THE INVENTION

The present invention is directed to a system for measuring the elapsed time interval between the successive closures of two key contacts associated with each keyboard switch on a keyboard operated electronic musical instrument. The measured elapsed time interval is used to control the peak amplitude of a generated musical tone.

Figure 1:
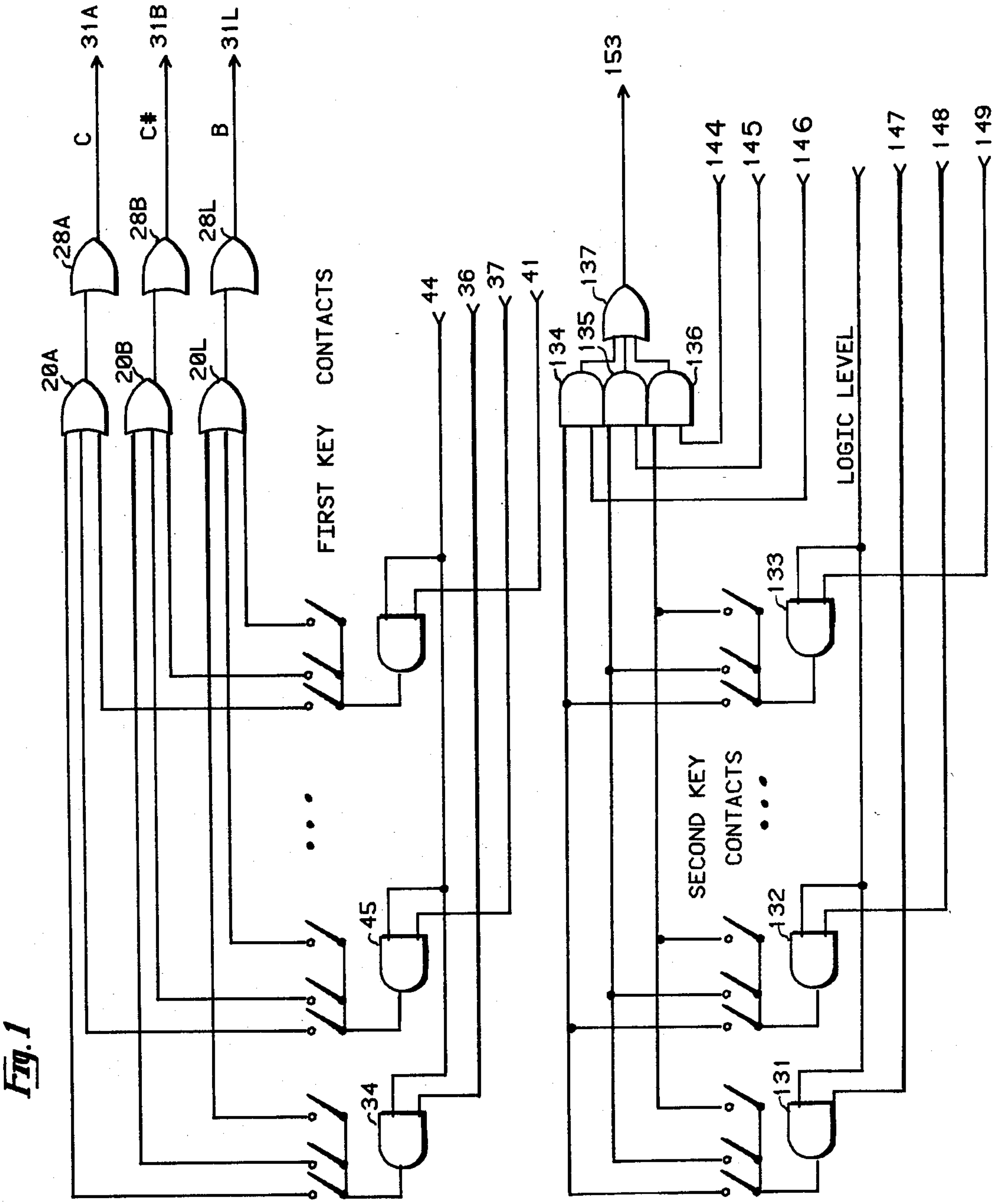
FIG. 1 is a schematic diagram of an embodiment of the invention.

FIG. 1 shows an embodiment of the present invention which is described as a modification and adjunct to the system in U.S. Pat. No. 4,022,098 entitled "Keyboard Switch Detect And Assignor." This patent is hereby incorporated by reference.

In the following description all elements of the system which are described in the referenced U.S. Pat. No. 4,022,098 are identified by two digit numbers which correspond to the same numbered elements in the referenced patent.

In FIG. 1 there are shown two sets of key contacts arranged such that there is a member of the first key contacts and a corresponding member of the second key contacts associated with each keyboard switch in a linear array of keyboard switches. Although not shown explicity in FIG. 1, the corresponding key contacts for each keyboard switch are mechanically connected. The key contacts, as shown, are arranged in groups. These groups can be octaves or any other desired sequence of notes.

The corresponding first key contacts for the keyboard switch array are combined in an OR-gate. For example, if the groups each correspond to an octave of musical notes then key contacts for notes $C_2$, $C_3$, $C_4$, . . . , $C_7$ are connected to the OR-gate 20A. The key contacts for notes C#2,C#3, . . . , C#6 are connected to the OR-gate 20B, and continuing in like fashion to the end with notes B2,B3, . . . , B6 being connected to the OR-gate 20L.

The output signal from the OR-gate 20A is combined with a similar signal from other keyboards by the OR-gate 28A. In similar fashion the set of OR-gates 28A to 28L are used to accommodate signals from other keyboards if more than one keyboard is used in the musical instrument.

The first key contacts are scanned in the manner described in the referenced U.S. Pat. No. 4,022,098. The keyboard switch detect and assignor system operates in two independent modes called search and preassign. During the search mode, the system continuously searches the first set of key contacts for a keyswitch state change in a programmed search pattern. When any keyswitch state change is found for the first set of key contacts, the system automatically is caused to terminate the search mode and enter the preassign mode. In the preassign mode several logical decisions are made. First, the system ascertains if a change of state has occurred for a first key contact that is detected to be closed on the current search mode, or for any first key contact which was detected to be closed on the immediate preceding search scan. If a current search scan indicates a first key contact closure that was not detected on an immediate prior search mode, then a new first key contact closure has been detected. When a new first key contact closure is detected, the associated key is identified and the identifying data information is encoded into a digital word which is stored in a memory. A keyswitch state change is obtained by depressing a keyboard switch to its actuated position, or state, or by releasing a previously depressed switch to its unactuated position, or state.

Figure 2:
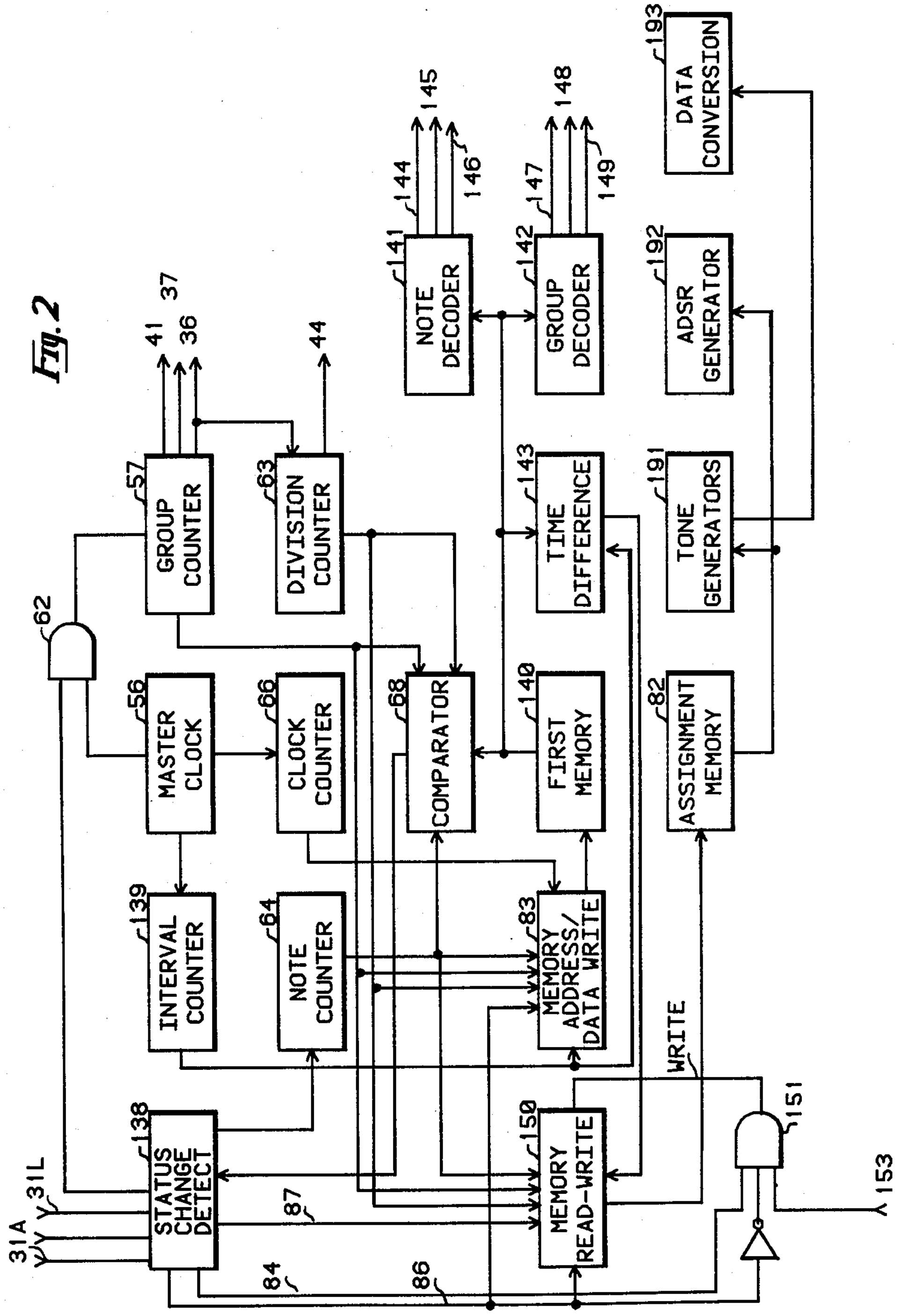
FIG. 2 is a diagram illustrating the scanning and detection logic.

The details of the scanning and detection logic are shown in FIG. 2. As shown in FIG. 1, there is an AND gate connected to each group of first keyswitch contacts. The division counter 63 provides a binary logic state signal "1" on line 44 when the key detect system is scanning the first set of key contacts. The group counter 57 generates signals in succession on lines 36–41 in response to timing signals generated by the master clock 56. In this fashion the first key contacts are scanned in groups.

The details of the block labeled status change detect 138 are shown in detail in FIG. 2 of the referenced U.S. Pat. No. 4,022,098. As described in the referenced patent, a binary logic state signal "1" will appear on line 84 if the current assignment data word provided to the comparator 68 corresponds to a temporary, or preassignment, of a tone generator. A "1" signal appears on line 87 if the status change detect 138 finds that a keyswitch in the first set of key contacts has changed from an unactuated to an actuated switch state. A "1" signal appears on line 86 if a keyswitch state on the first set of key contacts has been detected as having a keyswitch status change and the keyswitch is now open, and if an assignment data word is detected by the comparator 68 as having been previously assigned.

The first key contacts are scanned in a manner previously described to determine the switch states of the key contacts. If a keyswitch state has changed from an unactuated to an actuated state, an assignment is made as described in U.S. Pat. No. 4,022,098 if an unassigned tone generator is available. However, in the present modification of the key detect system, the first assignment is called a preassignment and the corresponding assignment information is temporarily stored in a first memory 140. In the present system the assignment data word is encoded with the detection time as well as the division, group (octave) note (note within the octave) information.

To reduce the time required to scan the second key contacts, the second key contact scan in implemented using the preassigned assignment data word which was encoded and stored in the first memory 140. The second key contacts are only scanned for those key contacts which correspond to key contacts which have already been detected to be in the actuated (closed) state on corresponding key contacts in the first set of key contacts.

The assignment data word read out of the first memory 140 is decoded onto the set of signal lines 147 to 149 by means of the group decoder 142. The binary logic state "1" signals do not appear simultaneously on the lines 147–149 but occur at different times depending upon when the assignment data words are read out of the first memory 140. As shown in FIG. 1, the AND-gates 131–133 are used to scan the octaves for the second key contacts in response to the octave data for the assignment data words read out of the first memory 140. In this fashion a fast scan is implemented for the second key contacts because only octaves are scanned corresponding to closed key contacts which have already been detected in the first key contacts.

The note decoder 141, shown in FIG. 2, is used to decode the note information encoded into the assignment data words read out of the first memory 140. The note information is encoded onto one of the set of signal lines 144–146. As shown in FIG. 1, a binary logic state "1" signal will appear on the line 153 from the output of the OR-gate 137 when one of the second key contacts is closed which corresponds to its associated key contact which has previously been detected to have been closed in the first set of key contacts.

The manner of scanning only a limited set of the second key contacts is implemented to reduce the length of time required to scan these key contacts. The smaller the scan time, the larger is the keyswitch closing speed which can be measured by the two successive key contact closing arrangement.

As described below, the time is noted at which a second key contact is detected as having been closed after the detection of the closure of its corresponding first key contact. A speed number is then computed as the difference in time between the successive closure of the first and second key contacts. This speed number is then combined with the assignment data word stored in the first memory and the encoded result is stored in the assignment memory 82. The speed number is a measure of the speed for actuating a keyboard switch.

In FIG. 2, the logic blocks having two digit identifying labels correspond to the same numbered system logic elements shown in FIG. 2 of the referenced U.S. Pat. No. 4,022,098. The status change detect 138 contains all the functions shown in FIG. 2 of the patent except for those shown explicity in FIG. 2 of this description.

If the status change detect 138 finds that a keyswitch in the first set of key contacts has changed from an unactuated to an actuated state, a write signal having a binary logic state "1" is generated on line 87. This "1" signal cause an assignment data word to be written into the first memory 140. The assignment data word is encoded with the group counter 47 state (octave), the division counter 63 state, the note counter 64 state, and the state of the interval counter 139. In addition the status bit of the assignment data word is set to a binary "1" logic state to denote the preassignment of an available tone generator. It is important to note that this is a preassignment and that the actual assignment of the tone generator does not occur until a corresponding key contact has been detected as having been actuated in the second set of key contacts.

Assignment data words are sequentially and repetitively read out of the first memory 140 in response to memory addresses provided by the memory address/data write 83. The read out assignment data words are furnished to the time difference 143, the group decoder 142 and the note decoder 141. The group decoder 142 decodes the group status bits encoded in the assignment data word on to the group signal lines 147–149. The signals on these lines cause only the corresponding single octave, or group of keys, on the second set of key contacts to be scanned for each assignment data word read out from the first memory 140. The note decoder 141 decodes the note status bits encoded in the assignment data word on to the note signal lines 144–146. The signals on the note signal lines cause only the key contacts on the second set of key contacts to send a signal on line 153 if a key contact is closed which corresponds to the note encoded on the note signal lines. In this fashion only the corresponding single keyswitch contact in the second set of key contacts is scanned for the current assignment data word read out from the first memory 140.

The time difference 143 computes the time difference between the time bits encoded in the assignment data word read out from the first memory 140 and the present state of the interval counter 139 by subtracting the binary number represented by the time bits from the binary number of the state of the interval counter. The computed time difference is provided as one of the data input signals to the memory read-write 150. The count state of a counter is a digital word that denotes the number of times the counter has been incremented.

As described above, a binary "1" logic signal will be generated on line 153 if a temporary, or preassignment, of a tone generator has been made for a key contact in the first set of key contacts which was detected to have a status change from an unactuated to an actuated state, if a tone generator is available for assignment, and if the corresponding contact in the second set of key contacts has been actuated. The AND-gate 151 will generate a WRITE signal if there is a binary "1" logic signal on line 153, if a "0" signal appears on line 86, and if a "1" signal appears on line 84. A "1" logic state signal on line 86 is a signal to reset an assignment data word to its unassigned state. As described in the referenced U.S. Pat. No. 4,022,098, a "1" signal appears on line 86 if a keyswitch state in the first set of key contacts has been detected as having a keyswitch status change and the keyswitch is now open in its unactuated state, and if the assignment data word is found by the comparator 68 as having been previously assigned and is stored in the first memory 140. A "1" logic state signal will appear on line 84 if the current assignment data word provided to the comparator 68 corresponds to a temporary or preassignment of a tone generator.

In response to the WRITE signal from the AND-gate 151, the memory read-write 150 generates an assignment data word which is stored in the assignment memory 82. This assignment data word is encoded to indicate a tone generator assigned status, the group number, the division number, and the time difference between the successive closing of a first and second key contact for the same keyboard switch.

If a keyswitch contact on the first set of key contacts is detected as having a switch status change from an actuated to an unactuated switch state, a binary logic "1" signal is generated on line 86 by the status change detect 138 in the manner described in the referenced U.S. Pat. No. 4,022,098. In response to a "1" signal on line 86, the memory read-write 150 places a "0" bit in the corresponding assignment data word stored in the assignment memory 82 in the encoded bit position which places the corresponding tone generator in an unassigned status as soon as it complete its release phase of its ADSR (attack/decay/sustain/release) signal modulation. A "1" logic signal on line 86 also causes the memory address/data write 83 to place a "0" bit in the assignment bit position on the data corresponding assignment data word stored in the first memory 140. This process frees the assignment data word for a new preassignment for a keyboard switch.

The interval counter 139 can be implemented to have a sufficiently large count capability so that it cannot be reset for several hours. Thus there would be little danger of having a count state reset because of a counter modulo action between the successive closing of an associated first and second key contact for a single keyboard switch. An alternative implementation is to provide a count reset logic circuitry which resets the interval counter 139 to its minimal count state each time that it is found that all the tone generators for the keyboard division are in their unassigned states. A third arrangement is to implement the time difference 143 to compute the proper time interval difference for the case in which the counter is reset between the successive closures of a first and second key contact for the same keyboard switch.

The time interval, or speed, data coded into the assignment data word stored in the assignment memory 82 is utilized by the ADSR generators 192 and the data conversion 193 to produce a musical effect of a touch responsive variation by determining the loudness of the sound produced by the assigned tone generator. A subsystem for implementing the loudness control is described in U.S. Pat. No. 4,121,490 entitled "Touch Responsive Electronc Piano." This patent is hereby incorporated by reference. A system for implementing the ADSR generators 192 is described in U.S. Pat. No. 4,079,650 entitled "ADSR Envelope Generator." This patent is hereby incorporated by reference.

The time control interval data encoded into the assignment data word can also be used to control other musical effects which are touch responsive. These can include an initial detuning of the fundamental musical frequency which then slowly returns to the true musical frequency. Another application is to vary the frequency cut-off positions of a sliding format filter used in musical tone synthesizers.

The system shown in FIG. 2 can be augmented so that a measure can be made of both the speed with which a keyboard switch is depressed as well as the speed with which the keyboard switch is released. A measure of the release speed as can be used as control signal in a number of ways to produce a variety of musical effects. In particular, a measure of the release speed for a keyswitch can be used to individually control the release time for each assigned tone generator. Since a tone generator does not start its ADSR envelope release phase until a key contact in the first set of key contacts is deactuated (open state), the keyswitch release time measurement is automatically available before the ADSR generator is set to its release phase for a tone generator.

Figure 3:
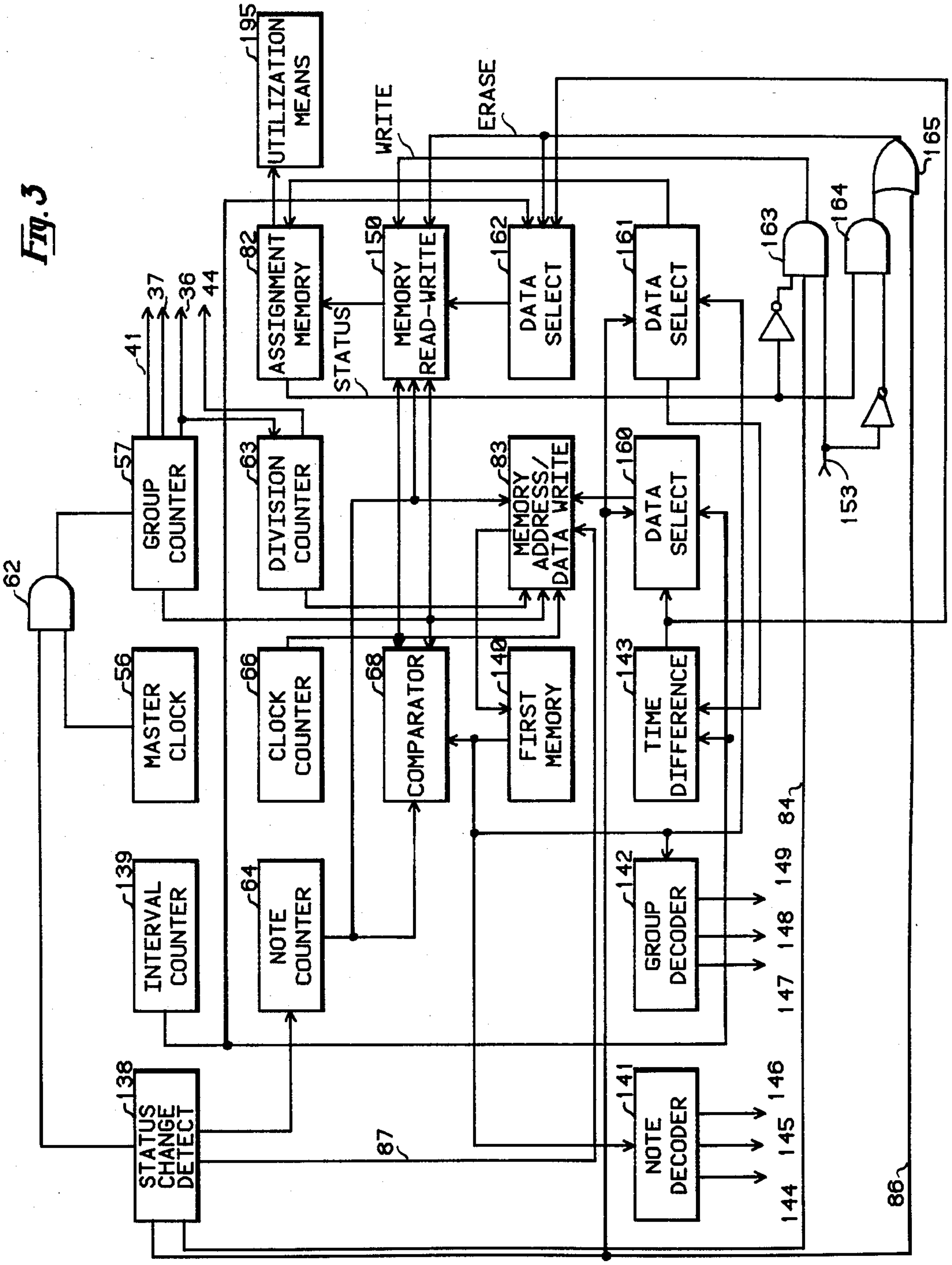
FIG. 3 is an alternate version of the invention implemented to measure the release speed.

FIG. 3 shows the logic details for a subsystem that will measure the speed with which successive pairs of key contacts are closed as well as the speed with which successive pairs of key contacts are opened by releasing a previously depresses or actuated keyboard switch.

The first and second set of key contacts are scanned in the same manner as that previously detailed for the system shown in FIG. 2. If the status change detect 138 finds that a keyswitch in the first set of key contacts has changed from an unactuated to an actuated switch state, a binary logic "1" signal is generated on line 87. In response to a "1" signal on line 87, an assignment data word is encoded in the manner previously described for the system shown in FIG. 2 and is stored in the first memory 140.

The assignment data words are read out in response to addresses provided by the memory address/data write 83. The note decoder 141 decodes the note information from the read out assignment data word onto the note lines 144–146. Thus a binary "1" logic signal will appear on line 153 when a key contact in the second set of key contacts is closed which corresponds to its associated key contact which has already been detected to have been closed in the first set of key contacts.

The current assignment data word stored in the first memory 140 and read out will be encoded with the count state on the interval counter 139 if line 86 has a binary "0" state. It is recalled that a "0" state on line 86 indicates that a keyswitch contact on the first set of key contacts has been detected as having a state change and the keyswitch contact is now actuated (closed position). In response to a "0" state signal on line 86, the data select 160 selects the count state of the interval counter. The selected data is encoded as in the assignment data word as the time data for a first switch contact closure and the assignment data word is then stored in the first memory 140.

The data select 161 will select either an assignment data word read out of the first memory 140 or an assignment data word read out of the assignment memory 82 in response to the binary logic signal state of line 86. If this line has a "0" state then the assignment data word read out from the first memory 140 is selected. It is noted that the assignment data words read out simultaneously from the first memory 140 and the assignment memory 82 correspond to the same keyboard switch. The assignment data word stored in the first memory 140 is a preassignment data and is not used to control the assignment of a tone generator. The assignment data word stored in the assignment memory 82 is read out and furnished to the utilization means 195 to control the assignment of a tone generator.

If line 86 has a "0" state then the detection time information encoded on the current assignment data word read out from the first memory 140 is provided to the time difference 143 which computes the time difference between the detection of the first contact key closure and the present count state of the interval counter 139.

The time difference, as represented by counts of the interval counter 139, is provided as one of the data inputs to the data select 162. The present count state of the interval counter 139 is provided as the second data input to the data select 162. The data select 126 selects the time difference data from the time difference 143 if the output signal from the OR-gate 165 has a "0" binary logic state. The time data provided by the data select 162 is encoded into the assignment data word by the memory read-write 150. The fully encoded assignment data word is stored in the assignment memory 82 with an encoded status bit which indicates that the corresponding tone generator has been assigned.

The logic output state of the OR-gate 165 will be "0" if the logic state output from the AND-gate 164 and the logic state of the line 86 are both "0". One signal input to the AND-gate 164 is the assignment status bit of the present assignment data word read out of the assignment memory 82. The second signal input to AND-gate 164 is the inverted logic state of the signal on line 153. Therefore the logic state output of the AND-gate 164 is a "0" if the present assignment data word read out from the assignment memory 82 has an unassigned status and a key contact in the second set of key contacts is found in its actuated switch state.

OR-gate 165 is not an essential element of the fundamental system operation. It is shown as a protective logic to compensate for a possible mechanical adjustment error in the alignment of the pairs of keyboard switch contacts. A "0" state logic signal appears on line 86 if a key contact in the first set of key contacts is detected by the status change detect 138 to have a contact status change from an actuated to an unactuated state (closed to open key contact change). If, because of a mechanical defect, both the key contacts paired on a single keyboard switch are touched, then both key contacts could be released simultaneously. OR-gate 165 takes care of this faulty situation which normally should not occur.

If the logic state output from AND-gate 163 is a binary "1", then the memory read-write 150 encodes the current assignment data word read out from the assignment memory 82 with the time data selected by the data select 162, the count state of the note counter 64, the count state of the group counter 57, the count state of the division counter 63, and an assigned generator status bit. The fully encoded assignment data word is stored in the assignment memory 82.

The output state from the AND-gate 163 is a logic "1" if the current assignment data word read out from the assignment memory 82 has a "0" in the assignment status bit denoting an unassigned tone generator, if a "1" state exists on line 153 indicating a detected key closure on the second set of key contacts, and if a "1" signal state exists on line 84 indicating that the current assignment data word read out of the first memory 140 corresponds to a temporary or preassignment of a tone generator based upon a key contact closure detection in the first set of key contacts.

From the preceding explanation it is evident that the system operation for measuring the time interval between pairs of successive key contact closures is essentially the same for the systems shown in FIG. 2 and FIG. 3. The fundamental difference lies in the use of the three data selects 160, 161, and 162. It will be shown below that these data select devices permit the system shown in FIG. 3 to measure the speed, or time interval, between the successive deactuation (opening) of the pair of key contacts associated with a single keyboard switch.

When a keyboard switch is released, the first action is to open a corresponding key contact in the second set of key contacts. In response to this first action a "0" logic state is placed on line 153 when the corresponding assignment data word is read out of the assignment memory 82. A "0" state on line 153 causes a "0" state to appear on the output of AND-gate 163. A "0" state from the AND-gate 163 prevents a data write by the memory read-write 150. A "0" state on line 153 produces a "1" state from AND-gate 164 if the current assignment data word read out of the assignment memory 82 has a "1" for the assignment status bit. In response to a "1" state from AND-gate 164, the data select 162 selects the count state of the interval counter 139. This select count state is encoded as the time information in the current assignment data word by the memory read-write 150 and the encoded assignment data word is stored in the assignment memory 82. In this fashion the assignment data word stored in the assignment memory 82 is encoded with the time at which the key contact in the second set of key contacts has been opened by the action of releasing a keyboard switch.

The next system action is initiated when the status change detect 138 finds that a key contact in the first set of key contacts has a status change from an actuated to an unactuated state (a closed contact has been opened). When such a state change is detected a logic "1" signal is placed on line 86. In response to a "1" signal on line 86, the data select 160 selects the count state of the interval counter 139 to be furnished to the memory address/data write 83. The memory address/data write 83 encodes the count state of the interval counter 139 into the time portion of the assignment data word currently read out from the first memory 140. This count state corresponds to the time at which the key contact in the first set of key contacts was opened. It is noted that the corresponding assignment data word stored in the assignment memory 82 has already been encoded with the time at which an associated key contact in the second set of key contacts has been deactuated.

In response to a "1" logic state signal on line 86, data select 161 will select the bits corresponding to the time encoding of the assignment data word read out from the assignment memory 82. The time difference 143 computes the time difference between the time encoding on this assignment data word and the count state of the interval counter 139. This computed time difference is furnished to the data select 162 which now selects this time difference to be encoded into the assignment data word which is then stored in the assignment memory 82. In this fashion the newly encoded assignment data word stored in the assignment memory 82 contains the speed, expressed in counts of the interval counter 139, between successive key contact openings for a pair of key contacts operated by a single keyboard switch which has been released.

The utilization means 195 comprises the tone generators 191, the ADSR generators 192, and the data conversion 193. The release speed information encoded into an assignment data word can be used by the ADSR generators 192 to control the timing of the release phase of the ADSR envelope modulation function provided to the corresponding tone generator. The inventive system provides a second dimension for a touch responsive musical instrument in that the key depression and key release speeds are independently measured for each individual keyboard switch.

We claim:

1. In combination with a keyboard operated musical instrument, apparatus for controlling a musical effect of a generated musical tone in response to the speed of actuating the keyboard switch by depressing said said keyboard switch comprising;

a plurality of keyboard switches arranged in a plurality of groups wherein each said group comprises a specified number of keyboard switches and wherein each one of said plurality of keyboard switches comprises a first switch contact and a second switch contact arranged such that in response to the depressing of a keyboard switch the first switch contact is actuated before said second switch contact is actuated, a first means for detecting a switch contact status change for the first switch contacts in said plurality of groups during a search mode whereby a first detect signal is generated in response to a detected first switch contact status change from an unactuated to an actuated state, a switch contact identifying means responsive to said first detect signal whereby an assignment data word is generated and encoded to identify one of said plurality of keyboard switches having a first switch contact which had a status change from an unactuated to an actuated state, a logic clock for providing timing signals, an interval counter for counting said timing signals, wherein the count state of said interval counter denotes the number of said timing signals that have been counted, a first memory means, a second memory means, a time encoding means whereby said count state of said interval counter is encoded into said assignment data word and whereby said assignment data word is stored in said first memory means, a first memory addressing means for reading out assignment data words from said first memory means, a second means for detecting a switch status change for the second switch contact corresponding to the keyswitch identified by said identification encoded into said assignment data word read out from said first memory means whereby a second detect signal is generated in response to a second switch contact change from an unactuated to an actuated state, a time difference means whereby in response to said second detect signal the computed difference between said count state of said interval counter and said count state encoded in said assignment data word read out from said first memory means is calculated and whereby said computed difference is encoded in said assignment data word, a second memory addressing means whereby in response to said second detect signal the assignment data word encoded by said time difference means is stored in said second memory means, and a utilization means responsive to assignment data words stored in said second memory means whereby musical tones are generated having a musical effect corresponding to said computed difference encoded in each one of said assignment data words.

2. Apparatus according to claim 1 wherein said first means for detecting further comprises;

a scan gating means for transferring said timing signals during said search mode and for not transferring said timing signals in response to said first detect signal, a group counter incremented by said timing signals transferred by said scan gating means wherein said group counter counts modulo a predetermined number, a division counter incremented each time said group counter attains its minimal count state, a first gating means responsive to the count states of said group counter and said division counter whereby said first switch contacts of said plurality of keyboard switches are provided with key state signals, and a state change means wherein said first detect signal is generated in response to a key state signal transmitted by an actuated first switch contact in said plurality of keyboard switches.

3. Apparatus according to claim 2 wherein said switch contact identifying means comprises;

a clock counter incremented by said timing signal wherein said clock counter counts modulo said number of keyboard switches in each one of said groups of keyboard switches, a second gating means interposed between said logic clock and said clock counter whereby said timing signals are transferred to said clock counter is response to said first detect signal, and a note counter incremented each time said clock counter attains its minimal count state wherein said note counter counts modulo said number of keyboard switches in each one of said groups of keyboard switches.

4. Apparatus according to claim 3 wherein said switch contact identifying means further comprises;

an encoder means whereby the count states of said division counter, said group counter, and said note counter are encoded into said assignment data word.

5. Apparatus according to claim 4 wherein said second means for detecting a switch status change comprises;

a comparator means for comparing an assignment data word read out of said first memory means with the count states of said division counter, said group counter, and said note counter and whereby a signal is generated if the corresponding encoded states of said assignment data word is equal to said count states, and a signal generating means whereby said second detect signal is generated if a signal is generated by said comparator means and a second switch contact has changed from an unactuated to an actuated state.

6. Apparatus according to claim 1 wherein said utilization means comprises;

a plurality of musical tone generators, an addressing means for reading out assignment data words from said second memory means, an assignor means whereby one of said plurality of musical tone generators is assigned a corresponding assignment data word read out from said second memory means, and a plurality of envelope modulation function generators each of which is associated with a corresponding one of said plurality of musical tone generators whereby the loudness of the generated musical tone is responsive to said computer difference encoded in said corresponding assignment data word.

7. In combination with a keyboard operated musical instrument, apparatus for controlling a musical effect of a generated musical tone in response to the speed of actuating a keyboard switch by depressing said keyboard switch comprising;

a plurality of keyboard switches wherein each one of said plurality of keyboard switches comprises a first switch contact and a second switch contact arranged such that in response to said depressing of a keyboard switch the first switch contact is actuated before said second switch contact is actuated, a first means for detecting a switch contact status change for a first switch contact status change whereby a first detect signal is generated in response to a detected first switch contact status change from an unactuated to an actuated state, a switch identifying means whereby an assignment data word is generated which identifies one of said plurality of keyboard switches whose first contact switch actuation generated said first detect signal, a second means for detecting a switch status change for a second switch contact status change corresponding to the keyboard switch in said plurality of keyboard switches identified by said assignment data word whereby a second detect signal is generated in response to said second switch contact having a status change from an unactuated to an actuated state, a time difference means responsive to said second detect signal whereby said assignment data word is encoded with the difference in elapsed time between the generation of said first detect signal and the generation of said second detect signal produced in response to said depressing of a keyboard switch and whereby said time difference corresponds to the speed of depressing said keyboard switch, and a utilization means responsive to said assignment data word whereby a musical tone having a musical effect corresponding to said encode time elapse is generated.

8. In combination with a keyboard operated musical instrument, apparatus for controlling a musical effect of a generated musical tone in response to the speed of the release of a keyboard switch comprising;

a plurality of keyboard switches wherein each one of said plurality of switches comprises a first switch contact and a second switch contact arranged such that in response to said release of a keyboard switch the second switch contact is deactuated before said first switch contact is deactuated, an assignor means whereby an assignment data word is created which identifies a depressed keyboard switch in said plurality of keyboard switches, an assignment memory means for storing each said assignment data word, a memory reading means for reading out assignment data words from said assignment memory means, a first means for detecting responsive to an assignment data word read out from said assignment memory means whereby a first detect signal is generated in response to a detected second switch contact status change from an actuated to an unactuated state for the keyboard switch in said plurality of keyboard switches which is identified by said read out assignment data word, a second means for detecting responsive to said assignment data word read out from said assignment memory means whereby a second detect signal is generated in response to a detected first switch conact status change from an actuated to an unactuated state for said keyboard switch in said plurality of keyboard switches which is identified by said read out assignment data word, a time difference means responsive to said second detect signal whereby said assignment data word read out from said assignment memory means is encoded with a time interval which is the difference in time between the generation of said first detect signal and the generation of said second detect signal produced in response to the release of a keyboard switch whereby said time interval corresponds to said speed of the release of a keyboard switch and whereby said encoded assignment data word is stored in said assignment data memory, and a utilization means responsive to said assignment data word whereby a musical effect of a generated musical tone is responsive to said encoded time interval.

9. Apparatus according to claim 8 wherein said plurality of keyswitches are arranged in a plurality of groups of keyswitches.

10. Apparatus according to claim 9 wherein said assignor means comprises;

a third means for detecting a switch contact status change for the first switch contacts in said plurality of groups during a search mode whereby a third detect signal is generated in response to a detected first switch contact status change from an unactuated to an actuated state, and a switch contact identifying means responsive to said third detect signal whereby said assignment data word is generated and encoded to identify one of said plurality of keyboard switches having a first switch contact which had a status change from an unactuated to an actuated state.

11. Apparatus according to claim 8 wherein said utilization means comprises;

a plurality of musical tone generators, a tone generator assignor means whereby one of said plurality of tone generators is assigned a corresponding assignment data word read out from said assignment memory means, and a plurality of envelope modulation function generators each of which is associated with a corresponding one of said plurality of musical tone generators whereby the release phase timing is responsive to said time interval encoded in said corresponding assignment data word.

* * * * *